United States Patent [19]
Haussuehl

[11] 3,815,973
[45] June 11, 1974

[54] METHOD FOR OBTAINING A HARMONIC FREQUENCY USING A POTASSIUM BROMATE NONLINEAR OPTICAL COMPONENT

[76] Inventor: Siegfried Haussuehl, Weyertal 82, Cologne, Germany

[22] Filed: Mar. 7, 1972

[21] Appl. No.: 232,410

[30] Foreign Application Priority Data
Mar. 26, 1971   Germany............................ 2114741

[52] U.S. Cl. ........................... 350/160 R, 307/88.3
[51] Int. Cl. ............................................. G02f 1/28
[58] Field of Search......... 350/160 R, 161; 307/88.3

[56] References Cited
UNITED STATES PATENTS
3,506,843   4/1970   Berman, Jr. et al. ............... 307/88.3
3,665,205   5/1972   Bridenbaugh et al.............. 307/88.3

*Primary Examiner*—Ronald L. Wibert
*Assistant Examiner*—V. P. McGraw
*Attorney, Agent, or Firm*—Hill, Gross, Simpson, Van Santen, Steadman, Chiara & Simpson

[57] ABSTRACT

A nonlinear optical component having a single crystal characterized by the single crystal being a trigonal crystal of potassium bromate. The single crystal is a piezo electric crystal with electro-optical properties which is useful in a system for either producing a harmonic frequency of electromagnetic radiation in the infrared, visible and ultraviolet spectral range or modulating a beam of electromagnetic radiation. The crystal is also useful as a piezoelectric device for generating acoustical vibrations, for use as a spark generator, for use as a frequency generator, for use as a frequency stabilizer, and for use as an electrical acoustical transformer and receiver.

1 Claim, 1 Drawing Figure

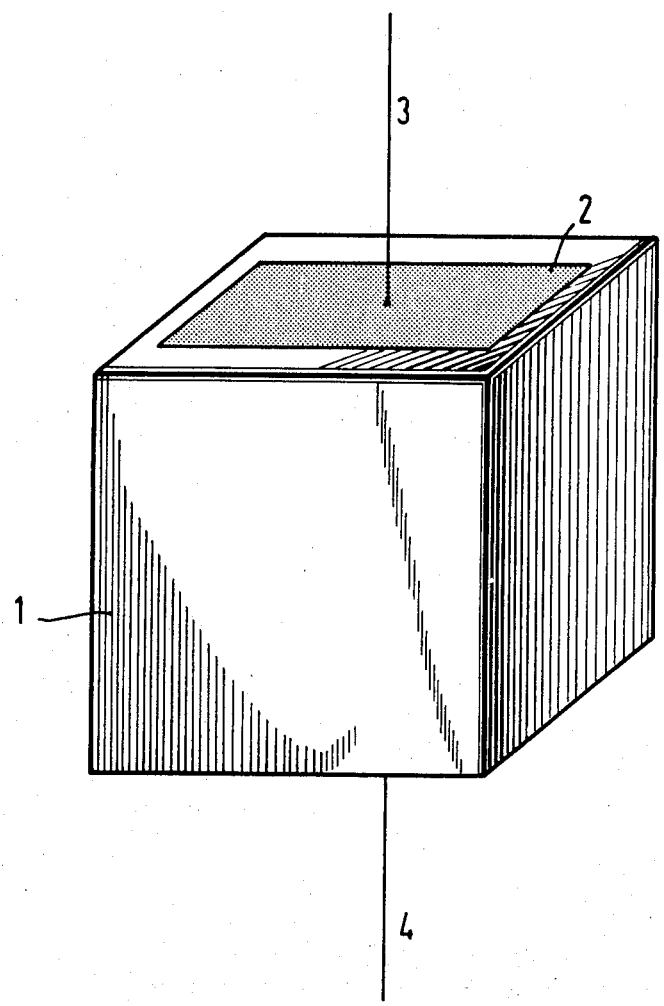

METHOD FOR OBTAINING A HARMONIC FREQUENCY USING A POTASSIUM BROMATE NONLINEAR OPTICAL COMPONENT

BACKGROUND OF THE INVENTION

1. Field of the Invention

The present invention is directed to a nonlinear optical component particularly useful in a system to modulate a light beam or in a system for generating a harmonic frequency of a base frequency of electromagnetic radiation.

2. Prior Art

Nonlinear optical material, such as ammonium dihydrogen phosphate (ADP), potassium dihydrogen phosphate (KDP) or lithium niobate (LiNbO$_3$) are known for use as a crystal component to produce a doubling in the frequency of light radiated on the crystal. Each of these materials have nonlinear dielectric characteristics whose permittivity is a function of the electrical field strength. If light of a certain frequency, a so-called basic frequency, is radiated into the crystal, a light is emitted by the crystal which is a harmonic frequency of the basic frequency initially radiated on the crystal. Nonlinear optical components have also been suggested for modulation on electromagnetic radiation such as a light beam.

SUMMARY OF THE INVENTION

The present invention is directed to a nonlinear optical component for electromagnetic radiation in the infrared, visible and ultraviolet spectral ranges which component has a larger effectivity than the known components using known crystals. The component has a single crystal which basically consists of a trigonal crystal of potassium bromate which is preferably a doped crystal and which crystal is a piezo electric crystal with electro-optical properties. The component is adapted for use in a system for handling electromagnetic radiation and can be used to produce a harmonic frequency of the frequency of light projected on the component. With electrodes to apply a voltage to the single crystal, the component can be used in an electro-optical system for modulating a light beam passing through the crystal or for deflecting the light beam. The crystal is also useful as a piezoelectric device in a system as either an acoustical vibration generator, a spark generator, a frequency generator, a frequency stabilizer, or an electrical acoustical transformer or receiver.

BRIEF DESCRIPTION OF THE DRAWING

The FIGURE is a perspective view of the component of the present invention.

DESCRIPTION OF THE PREFERRED EMBODIMENT

The principals of the present invention are particularly useful when incorporated in a nonlinear optical component 1 which is illustrated as having an electrode 2 of a pair of electrodes on one surface which electrode has a lead 3 and the other electrode of the pair has a lead 4. The leads 3 and 4 deliver an appropriate control signal to the pair of electrodes to apply a voltage to the crystal to achieve an electro-optic effect and the signal is provided to the leads in the conventional manner.

The nonlinear optical component 1 has a single crystal which basically consists of a single trigonal crystal of potassum bromate which has a formula of KBrO$_3$. Preferably the single crystal is a doped trigonal crystal of potassium bromate. The crystal of potassium bromate, whether doped or not doped is a piezo electric crystal and can be used to apply an electro-optic effect on electromagnetic radiation.

It was found that a single trigonal crystal of the potassium bromate not only has extremely high components for the nonlinear tensor of the dielectric susceptibility but also has the optical properties such as anisotropy and dispersion which are required for a phase adjustment of of the primary and secondary electromagnetic waves. Therefore the crystal is well suited for the phase adapted frequency doubling as well as for control and modulation of electromagnetic radiation with a high efficiency. The phase adaptation takes place in the dispersion between a basic wave and its harmonic frequency if a compensation is made by the suitable selection of the index of refractipn difference of these waves. An index of refraction difference occurs for different orientation of the electrical vector with respect to the crystal coordinate system due to the optical anisotropy of the crystal.

Since the speed of a wave decreases with increasing frequency in a dispersive crystal and the speed is also a reverse proportion to the index of refraction, a phase adjustment can be reached by changing the amount of double refraction of the light beam by the crystal. For instance the amount of double refraction of the light beam can be changed by turning the crystal so that the angle of orientation of the beam is changed with respect to the optical axis of the crystal. The amount of double refraction of the light beam can also be changed by the electro-optical effect, for example, by an application of a voltage to the electrodes which are attached to the crystal.

The crystal has a good transparency for radiation in a range other than the visible spectral range and thus the crystal can be used with radiation which is in the infrared and ultraviolet spectral ranges.

Since the single trigonal crystal of potassium bromate has electro-optical properties, the crystal of the invention are especially suited for electro-optical purposes such as modulation, control and deflection of electromagnetic radiation.

Furthermore, it was found that the trigonal potassium bromate also shows extremely strong piezo electrical effects of longitudinal and transversal kind. Because of the low electrical conductivity of the trigonal potassium bromate, the longitudinal acoustical waves are dampened only a very small amount. Based on these favorable piezo electrical features of the trigonal potassium bromate, the single crystals are suited for use as a piezoelectric device especially for piezo electrical generators of acoustic vibrations, for electro-acoustic transformers and receivers, for frequency generators and frequency stabilizers in the high frequency technique as well as for spark generators for ignitions of all kind. The single crystal of potassium bromate can be used in a system which requires an element to perform these functions.

Although various modifications might be suggested by those versed in the art, it should be understood that I wish to employ within the scope of the patent granted hereon, all such modifications that reasonably and properly come within the scope of my contribution to the art.

I claim:

1. A method for obtaining a harmonic frequency of a basic frequency of electromagnetic radiation in the infrared, visible and ultraviolet spectral region comprising the steps of attaching a pair of electrodes to the opposite surfaces of a nonlinear optical component consisting essentially of a single crystal of potassium bromate, projecting electromagnetic radiation of the basic frequency through said nonlinear optical component and applying a control voltage to said electrodes to control the electro-optical effect of said crystal.

* * * * *